UNITED STATES PATENT OFFICE.

ALBRECHT SCHMIDT, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

PROCESS OF DEHYDRATING SODIUM HYDROSULFITE.

No. 892,186.        Specification of Letters Patent.        Patented June 30, 1908.

Application filed June 12, 1906. Serial No. 321,345.

*To all whom it may concern:*

Be it known that I, ALBRECHT SCHMIDT, Ph. D., chemist, a citizen of the Empire of Germany, and residing at Höchst-on-the-Main, Germany, have invented certain new and useful Improvements in the Process of Dehydrating Sodium Hydrosulfite Containing Water of Crystallization, of which the following is a specification.

It is known that sodium hydrosulfite crystallizes from concentrated aqueous solutions with 2 molecules of water of crystallization. I have found that if such crystallized sodium hydrosulfite $Na_2S_2O_4.2H_2O$, obtained, for instance, by hard pressing the crystalline magma which separates from the cold concentrated aqueous solution to be heated to 60°–70° C., preferably while stirring, the large transparent crystals become opaque; water is set free and the mass becomes a granular magma, totally changing its aspect. A dehydrating process occurs here analogous or similar to that which occurs on heating crystallized sodium carbonate in its water of crystallization. By the present process a granular sodium hydrosulfite is separated. From this granular mass, which may even be allowed to cool for a short time without becoming hydrated again, the sodium hydrosulfite may be separated by pressing or draining, whereupon the salt may be dried in a vacuum, or else the magma, containing the dehydrated hydrosulfite may be quickly dried directly in a vacuum. The crystallized sodium hydrosulfite may also be transformed by simply heating it, if there be present indifferent, non-dehydrating liquids, insoluble in water, which permit more readily an equalization of the temperature between the wall of the vessel and the crystalline magma, such, for instance, as xylene, toluene, benzene or the like. For instance, the solid hydraulically pressed hydrated crystals may be introduced piece by piece into a heated vessel provided with an agitator and containing some toluene, the temperature of the mass being kept between 50 and 65° C, or a little above; the transformation occurs continuously. The magma thus obtained is then further worked up as above described.

Having now described my invention, what I claim is:—

1. The herein described process of dehydrating sodium hydrosulfite containing water of crystallization, which consists in heating the crystals to a temperature at which they split up to form a granular solid and a liquid, separating said granular solid from as much as possible of said liquid by pressing, and then completely drying said solid in a vacuum.

2. The herein described process of dehydrating sodium hydrosulfite containing water of crystallization, which consists in heating the crystals to a temperature at which they split up to form a granular solid and a liquid, separating the liquid from the solid mass, and then in drying pasty mass in a vacuum.

In testimony, that I claim the foregoing as my invention, I have signed my name in presence of two subscribing witnesses.

ALBRECHT SCHMIDT.

Witnesses:
 JEAN GRUND,
 CARL GRUND.